United States Patent [19]

Danford

[11] 4,263,721

[45] Apr. 28, 1981

[54] ENERGY EFFICIENT BULK TOBACCO CURING AND DRYING STRUCTURE

[76] Inventor: Tiras J. Danford, 707 N. Laurel, Quitman, Ga. 31643

[21] Appl. No.: 103,938

[22] Filed: Dec. 14, 1979

[51] Int. Cl.³ .............................. F26B 3/04; F26B 9/02
[52] U.S. Cl. .......................................... 34/35; 34/86; 34/93; 131/302
[58] Field of Search ................. 34/93, 34, 35, 86, 224, 34/225; 131/134, 135, 140 R

[56] References Cited

U.S. PATENT DOCUMENTS

| | | | |
|---|---|---|---|
| 1,863,586 | 6/1932 | Wilke | 165/165 |
| 3,337,967 | 8/1967 | Smith | 34/54 |
| 3,866,334 | 2/1975 | Huang | 34/93 |
| 4,069,593 | 1/1978 | Huang | 34/93 |
| 4,099,338 | 7/1978 | Mullin et al. | 34/86 |
| 4,114,288 | 9/1978 | Fowler | 34/86 |

*Primary Examiner*—Larry I. Schwartz
*Attorney, Agent, or Firm*—Mills & Coats

[57] ABSTRACT

The present invention entails an improved bulk tobacco curing and drying structure provided with a counter flow heat exchanger for reclaiming heat from exhausted air by transferring the reclaimed heat to inlet fresh air being induced into the structure prior to the inlet air combining with the system of air circulating interiorly within the structure.

19 Claims, 4 Drawing Figures

ENERGY EFFICIENT BULK TOBACCO CURING AND DRYING STRUCTURE

FIELD OF INVENTION

The present invention relates to curing and drying and more particularly to bulk tobacco curing and drying structures that are designed to cure and dry bulk contained tobacco.

BACKGROUND OF INVENTION

Since the early 1970's, bulk tobacco curing has gained wide acceptance in the flue cured tobacco producing regions of the United States. While there may be several factors contributing to its acceptance, probably the single most significant factor was that bulk curing generally required less manual labor than the preceding stick barn method. Further bulk curing was compatible with automatic tobacco harvesters that gained commercial acceptance also at about this same time.

While bulk curing is now a reality and will be for some time to come, the basic design of commercially available bulk tobacco curing and drying structures has not changed significantly since the initial design of F. J. Hassler as shown in U.S. Pat. Nos. 3,105,713 and 3,110,326.

Probably the most significant shortcoming of all conventional bulk curing and drying structures of today is that they are not designed to efficiently utilize fuel. To the contrary, it seems that the basic design of many commercially available bulk tobacco curing and drying structures is such that the structures themselves inherently waste fuel. Some attempts have been made to design more fuel efficient systems, but generally they have not been successful and have not met with commercial success. For example, in this regard, one is referred to U.S. Pat. No. 4,114,288 to Joe W. Fowler. The bulk tobacco curing and drying structure disclosed therein includes a design that attempted to utilize a solar collector and also included an approach in providing bulk tobacco curing and drying structure with a heat exchanger. But neither the heat exchanger design nor the solar collector panel was very efficient and consequently this type of design never obtained great success.

Therefore, there is a real need for the basic design in bulk tobacco curing and drying structures to be improved, especially in the area of efficient fuel utilization. This is particularly so because of the very nature of bulk tobacco curing and drying structures. During the bulk tobacco curing and drying process a continuous system of air is circulated through the structure and the air is heated as necessary to maintain a selected temperature level within the structure. As the tobacco material is dried, the circulating system of air reaches a point where its moisture level or content is such that a portion of the air must be exhausted and fresh inlet outside air must be induced within the curing and drying structure. It is within this area that most, if not all, tobacco curing and drying structures are inherently inefficient. This is because there is not adequate control to control the amounts of exhaust and incoming air and also of great importance is that the exhausted air is very warm and all the heat in the exhaust air is lost in conventional bulk tobacco curing processes.

Finally there is a real need for an improved bulk curing system because of the scarcity of fuel and the continuous escalation of fuel prices.

SUMMARY OF INVENTION

In view of the foregoing, the present invention entails an improved bulk tobacco curing and drying structure that is designed to more efficiently utilize fuel in curing and drying tobacco. In this regard, the bulk tobacco curing and drying structure of the present invention is provided with a counter flow heat exchanger that is adapted to channel relatively warm or hot moisture laden air being exhausted from the structure adjacent and in heat exchange relationship with inlet outside fresh air being induced into the structure to replace the exhausted air. In addition, the bulk tobacco curing and drying structure of the present invention is provided with positive exhaust fan means disposed about the exhaust side of said heat exchanger for positively inducing exhaust air from the curing and drying structure and through the heat exchanger.

Added to this is a solar collector panel assembly disposed about the top of said bulk tobacco curing and drying structure and which is adapted to receive fresh outside inlet air therethrough which is preheated by the solar energy collected thereby, and wherein the solar collector panel assembly is operatively associated with said heat exchanger for directing the inlet air from the solar collector panel assembly into and through the heat exchanger.

It is, therefore, an object of the present invention to provide a bulk tobacco curing and drying structure that is designed to more efficiently utilize fuel in the curing and drying process.

A further object of the present invention resides in the provision of a bulk tobacco curing and drying structure with a counter flow heat exchanger operatively associated with the structure such that the same acts to claim heat from the air exhausted from the structure and to transfer the reclaimed heat to inlet fresh air being directed into the curing and drying structure.

Still a further object of the present invention resides in the provision of a bulk tobacco curing and drying structure that is provided with positive fan means for inducing exhaust air from the structure, said positive fan means being disposed within the path of the exhausted air and being separate and independent from the forced air furnace system forming a part of the bulk tobacco curing and drying structure.

Another object of the present invention is to provide a bulk tobacco curing and drying structure with a solar panel collector assembly associated therewith and disposed about the top of the structure for collecting solar energy and transferring the collected energy in the form of heat to fresh inlet air being directed into the structure.

Still a further object of the present invention resides in the provision of an energy efficient bulk tobacco barn that is provided with a cooperative heat exchanger and solar collector panel assembly that cooperate with each other to preheat fresh inlet air prior to the inlet air joining the system of air circulating within the bulk tobacco curing and drying structure, with the fresh inlet air being first preheated by the solar collector panel assembly and then preheated by a heat exchanger that is designed to extract heat from air being exhausted from the structure and to transfer the extracted heat to the incoming fresh air.

It is also an object of the present invention to provide an energy efficient bulk tobacco curing and drying structure with a heat exchanger for extracting heat from exhausted air and transferring the same heat to fresh incoming air, wherein the heat exchanger is strategically placed about the curing and drying structure in relationship to the paths of exhaust and incoming air so as to effectuate an efficient energy transfer in a way that does not disturb or alter the basic air circulating pattern within the structure itself.

A further object of the present invention resides in the provision of an energy efficient bulk tobacco curing and drying structure of the character described above wherein the referred to heat exchanger is of the counter flow type and wherein the same is adapted to channel exhaust air within relatively thin defined conduits formed within the heat exchanger and which lie adjacent like formed conduits that channel, counter to the exhaust air, fresh incoming air into the structure.

Other objects and advantages of the present invention will become apparent from a study of the following description and the accompanying drawings which are merely illustrative of the present invention.

THE BULK TOBACCO CURING AND DRYING STRUCTURE

Figure 1:
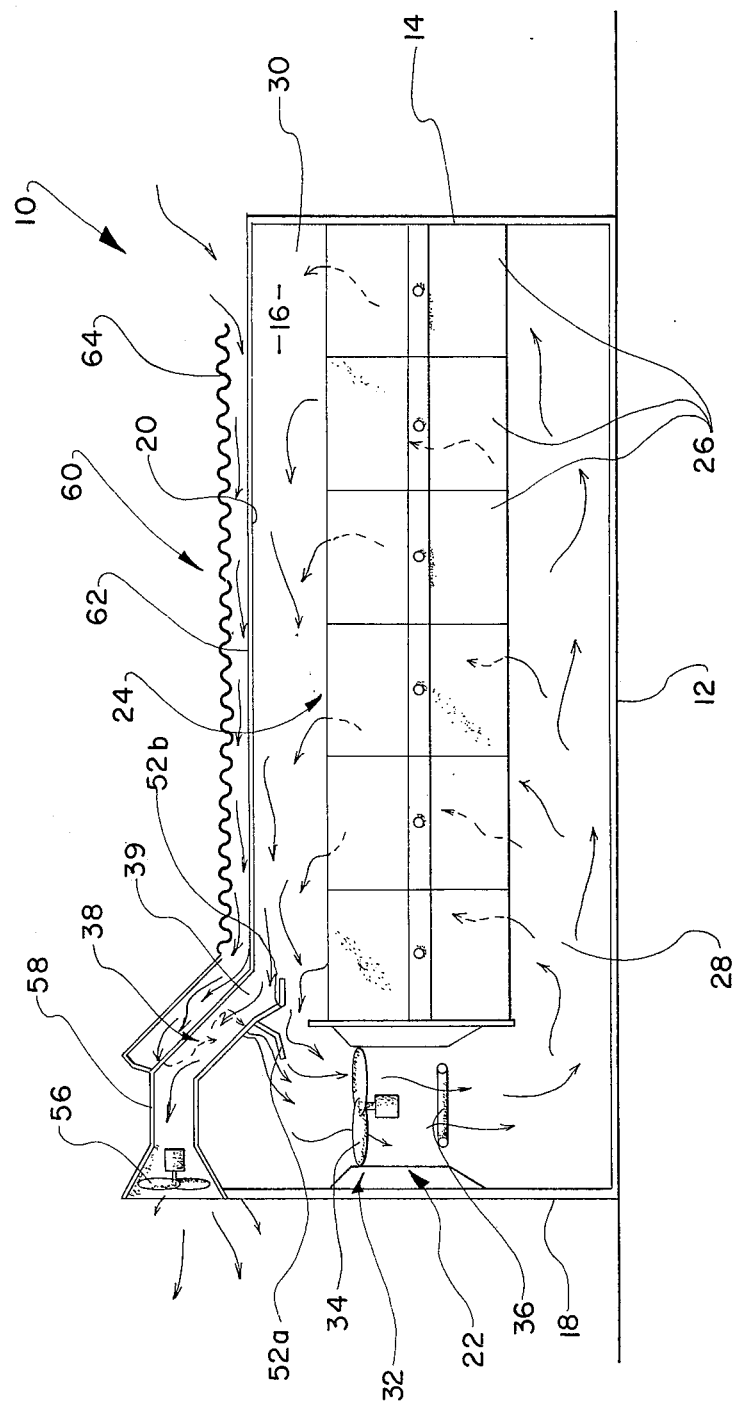
FIG. 1 is a side elevational view of the bulk tobacco curing and drying structure of the present invention with a side removed to better illustrate the internal structure and the air flow patterns within the bulk tobacco curing and drying structure.

With further reference to the drawings, particularly FIG. 1, the bulk tobacco curing and drying structure of the present invention is shown therein and indicated generally by the numeral 10. Briefly reviewing the basic structure of a conventional bulk tobacco barn or bulk tobacco curing and drying structure such as that referred to above, it is seen that the same includes a floor or concrete slab 12, a front end 14 that is provided with an access opening door or doors, a pair of sides 16, a rear end 18, and a top 20.

Defined about the rear of the structure 10 is a furnace room 22 that is generally divided from a drying chamber or room referred to by the numeral 24. Drying room 24 is adapted to receive and support a plurality of racks or container means 26 above a plenum 28 that is communicatively connected or open to the furnace room 22. It is appreciated that the racks or container means 26 are of conventional known form, that is either a single tier rack such as shown in U.S. Pat. No. 3,105,713 or a box type container such as that shown in U.S. Pat. No. 3,948,553. In either case, the bulk tobacco is contained or packed therein and supported above plenum 28 such that air can be continuously circulated verticaly therethrough to effectuate curing and drying of the contained tobacco. In this regard, it is seen that between top 20 and the top portion of the racks or container means 26 there is defined a space that is referred to as an upper air return area 30 that serves to accommodate air existing the bulk tobacco containers and allows the same to be circulated generally horizontally towards the furnace room 22.

In conventional fashion, the bulk tobacco curing and drying structure 10 is provided with a furnace system indicated generally by the numeral 32. Furnace system 32 is preferably of the forced air type and as such includes a fan 34 and a burner 36. Details of the furnace system 32 and associated automatic temperature controls are not dealt with herein in detail because such is not per se material to the present invention as any type of conventional furnace system of the type ordinarily used with bulk tobacco curing and drying structures would be acceptable. The important consideration is to appreciate that during the curing and drying process, furnace system 32 acts to circulate a system of air downwardly into the plenum 28 and upwardly through the bulk tobacco contained within the racks or container means 26 and to further return the air, or portions thereof, back to the furnace room 22 where the air can be continuously recirculated. In addition in conventional fashion, the furnace system may be provided with conventional thermostatically controlled means (including automatic temperature advancing means) for actuating the burner periodically to heat the air as necessary to maintain the temperature of air at a selected temperature level during the curing and drying process.

Figure 2:
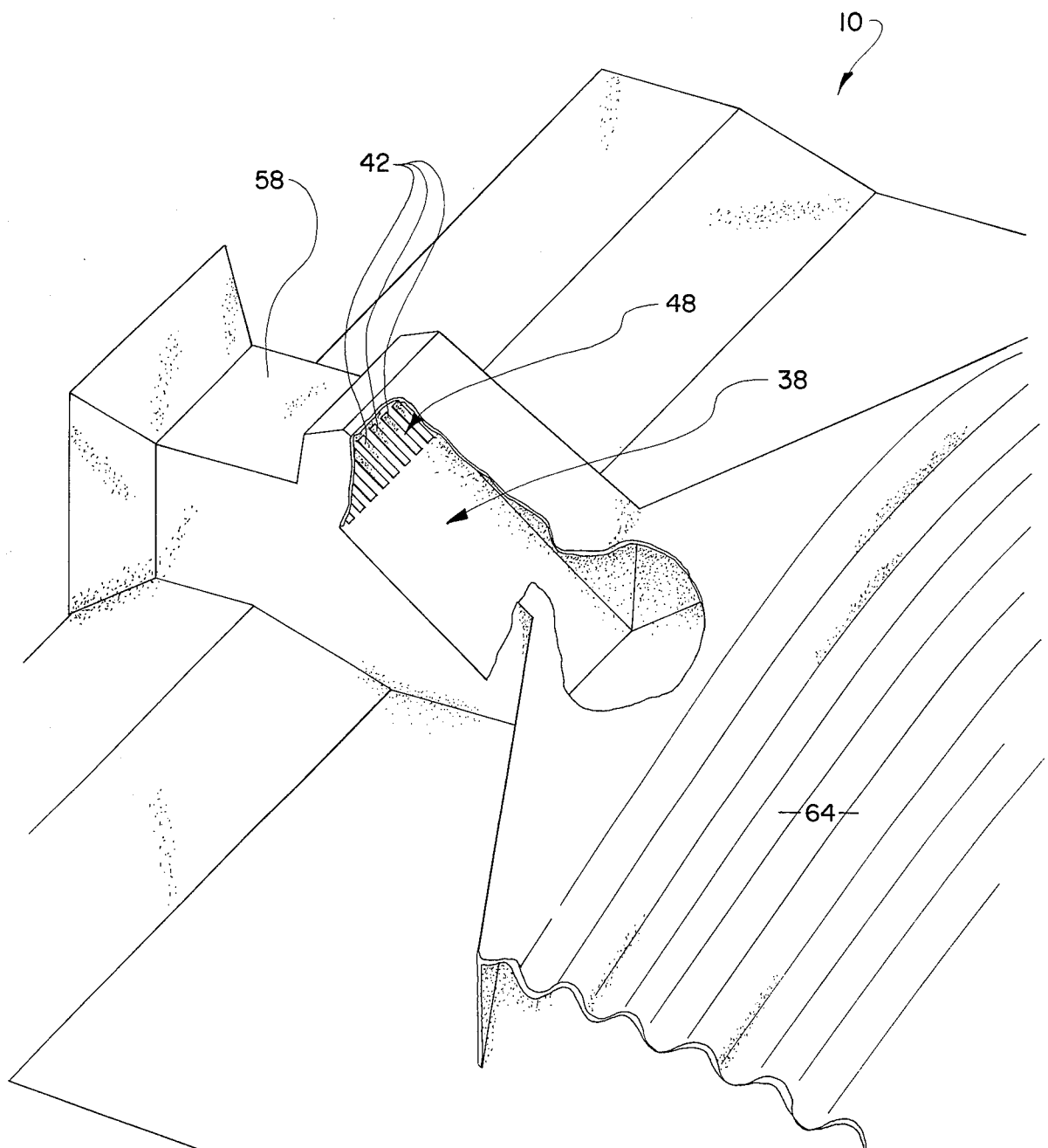
FIG. 2 is an enlarged perspective view illustrating the heat exchanger of the present invention and its relationship to the solar collector panel assembly.
Figure 3:
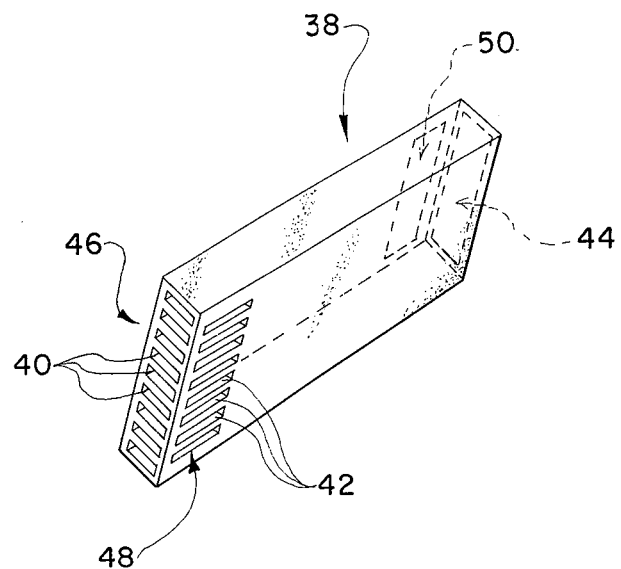
FIG. 3 is a perspective view of the heat exchanger.

During the drying phase, it is necessary to exhaust portions of the system of internal circulating air and to induce outside fresh air into the drying room 24 to replace the exhausted air. As shown in FIGS. 1 and 2, the present invention provides a heat exchanger, indicated generally by the numeral 38, that is disposed in the path of both the exhaust air and fresh inlet air so as to constrain such air to pass therethrough. Essentially, it is the intent of the present invention to provide a heat exchanger that will effectively reclaim heat associated with the exhaust air and transfer that heat to incoming fresh air.

Viewing heat exchanger 38 in more detail, it is seen that the same is disposed at an incline about a top portion of the structure 10. In this preferred embodiment, the heat exchanger is disposed about the rear top portion of the bulk tobacco curing and drying structure 10. An opening 39 is formed in the top 20 of the structure and heat exchanger 38 is mounted thereover such that air can be exhausted through said opening 29 and on through the heat exchanger 38, while also allowing incoming fresh air to pass through the heat exchanger into the structure through the same opening 39.

Still viewing heat exchanger 38, it is appreciated that the same is of the counter flow type, meaning that the exhaust air would flow counter to and in parallel relationship with the incoming fresh air. To accommodate this, heat exchanger 38 is provided with a plurality of exhaust passageways 40 and a plurality of inlet passageways 42. The respective passageways 40 and 42 are alternatively spaced such that typically an inlet passageway 42 for receiving and channeling incoming fresh air would be disposed between two exhaust passageways 40 and vice versa. Because each passageway would be bounded by a side panel constructed of a very good heat conductor such as a relatively thin sheet of aluminum that could be as thin as 0.016 inch, it follows that the heat associated with the exhaust air could be readily transferred to the fresh incoming air. Tests have indicated that this design is very efficient as exhaust air of 160 degrees Fahrenheit has dropped to under 100 degrees Fahrenheit upon passing through the heat exchanger 38.

As seen in the drawings, heat exchanger 38 is of a generally rectangular duct design and is particularly designed such that the exhaust air passing through the exhaust passageways 40 would be clearly maintained separately from the fresh incoming air passing through the inlet passageways 42. As particularly provided in the embodiment disclosed, the exhaust air enters one end section of the heat exchanger 38 and is exhausted from the opposite end section. In this regard, the heat exchanger can be said to include an exhaust inlet end 44 and an exhaust outlet end 46. The incoming fresh air is adapted to enter a top side portion of the heat exchanger referred to as an incoming air inlet section 48 while the same incoming air is exhausted from the heat exchanger 38 through an incoming air outlet section 50.

Cooperative with heat exchanger 38 is a deflector assembly indicated by the numeral 52. Deflector assembly 52 includes an exhaust deflector 52a that is adapted to guide and direct a portion of the circulating system of air within the structure 10 into the exhaust inlet end section 44 of the heat exchanger 38. In like manner the deflector portion 52b is adapted to guide and direct the incoming fresh air being exhausted out the air outlet section 50 of the heat exchanger 38 towards and to the furnace room 22 where the incoming fresh air can join the system of circulating air within the structure 10.

Extending over heat exchanger 38 is a housing structure 58 that houses heat exchanger 38 and further houses an exhaust fan 56 that is disposed about the exhaust side of the heat exchanger 38. Exhaust fan 56 is designed to operate completely independent and separately from said furnace system 32 and as such serves to positively exhaust air from the bulk tobacco curing and drying structure in a precise manner.

In addition to heat exchanger 38 already discussed hereinabove, the present invention provides a solar collector panel assembly 60 that is adapted to be disposed and situated about the top of the bulk tobacco curing and drying structure 10 to further preheat incoming fresh air prior to joining the system of air already circulating within the drying chamber or drying room 24 of the same structure. In this regard, the solar collector panel assembly 60 includes a generally thermally black surface 62 disposed about the top of the structure 10 and a corrugated fiberglass, transparent surface 64 disposed thereover and supported by a plurality of longitudinally extending Z-bars not shown. The Z-bars 66 divide the solar collector panel into a plurality of generally longitudinally extending fresh incoming air conduits. Incoming air is induced to enter between the black surface 62 and the corrugated fiberglass 64 and as the air moves therebetween it is heated by the solar energy collected about the surface 62.

As seen in the drawings, the solar collector panel assembly 60 is communicatively connected to the housing 58 so as to allow incoming fresh air to reach heat exchanger 38 and particularly the incoming fresh air inlet section 48 thereof. Consequently, it is appreciated that incoming fresh air is drawn between the corrugated fiberglass 64 and the black surface 62 and directed upwardly adjacent the top incline surface of the heat exchanger 38 where the fresh incoming air enters the exchanger. As the fresh incoming air enters the exchanger 38, it moves generally downwardly therethrough through the respective inlet air passageways 42 where heat from the exhaust air is transferred thereto. Incoming fresh air is exhausted out said exchanger 38 and this air is deflected by deflector panel 52b which directs the air into the furnace room 22 of the structure and on through the furnace system 32 where the incoming fresh outside air joins the system of air being circulated through the structure. As the incoming fresh air is directed into the structure, it follows that during selected portions of the drying period, certain portions of the circulating system of air may be exhausted as herein described above. In this regard, the air exhausted is constrained and directed to move through the heat exchanger 38 as described above. It is appreciated that this air, i.e., exhaust air, is positively exhausted by exhaust fan 56.

The exhaust fan 56 as it relates to the total design disclosed herein is a very significant step forward in bulk tobacco curing and drying. It takes much of the guess work out of curing and drying since previous to this invention it was a problem adjusting the conventional exhaust damper and wondering how much air was being exhausted through leaks in the barn.

Further with respect to the heat exchanger 38, it should be noted that the same would be provided with means to drain collected moisture condensed from the exhaust air.

Figure 4:
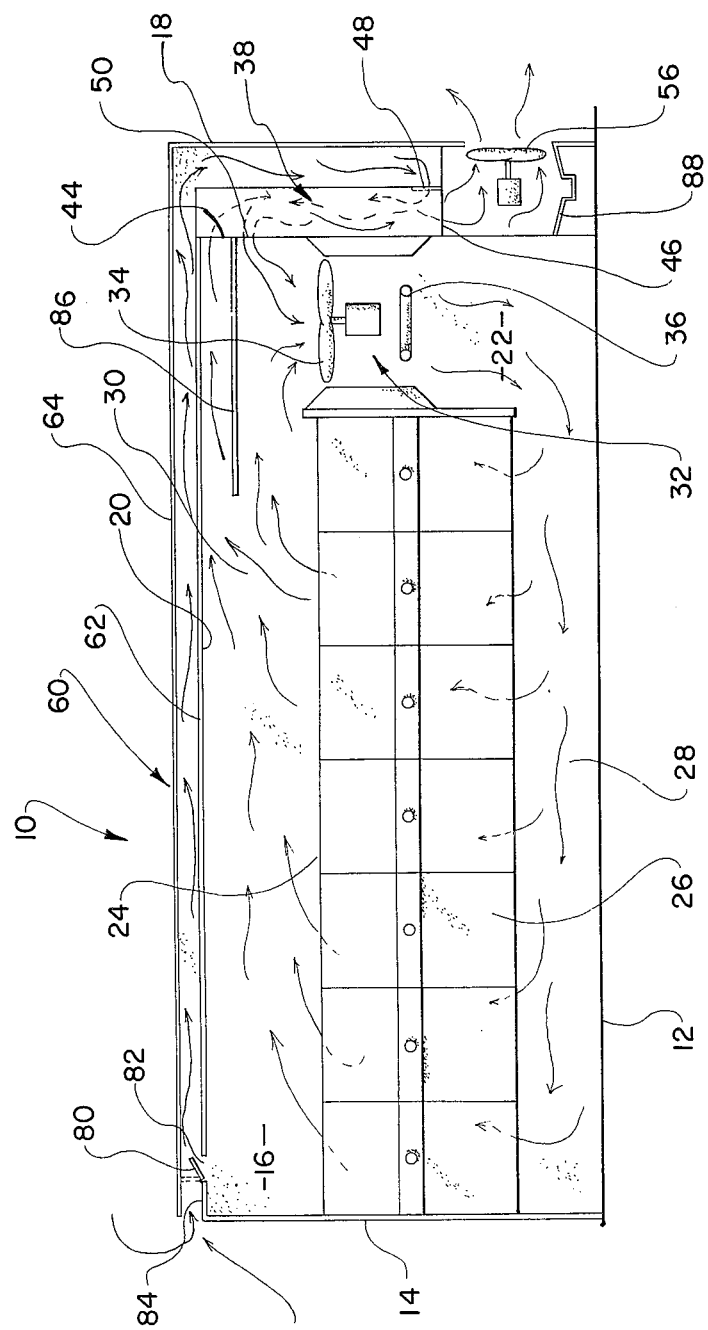
FIG. 4 is an alternate design for the bulk curing system of the present invention.

In FIG. 4, another design is shown for an energy efficient agricultural drying structure such as a bulk tobacco curing and drying barn. In this second design, it is appreciated that the drying structure is essentially the same as illustrated in FIG. 1 and discussed hereinabove. Like the first embodiment discussed above, the embodiment illustrated in FIG. 4 includes the solar collector panel assembly 60, a counter flow heat exchanger 38 and a positive exhaust fan 56.

The basic distinction between the embodiments illustrated in FIGS. 1 and 4 is the position of the heat exchanger 38 and the exhaust fan 56 with respect to the solar collector 60 and the drying structure 10 in general.

With reference to the embodiment illustrated in FIG. 4, it is seen that the solar collector 60 is again disposed atop the structure 10 and is provided with a fiberglass transparent upper surface 64 that is supported over a generally thermally dark collector surface 62 which is formed or disposed about the top 20 of the structure 10. Details of the solar collector panel assembly 60 already discussed hereinabove with respect to the embodiment illustrated in FIG. 1 will not again be dealt with regarding the design of FIG. 4.

As viewed in FIG. 4, there is provided an air inlet opening 84 about the top, front side of structure 10 that allows outside fresh air to be induced therethrough and horizontally through the solar collector 60 towards the rear of structure 10. As can be seen in FIG. 4, air directed through solar collector 60 turns downwardly at a generally right angle at the rear of the structure 10 and is directed downwardly a selected distance, after which the air again makes a generally right angle turn into the inlet section 48 of heat exchanger 38. Again it is emphasized that in a preferred embodiment that heat exchanger 38 would be of the counter flow type and as such would include a plurality of inlet passageways 42 that would allow air to move through the heat exchanger into the area above the fan 34. At this point the air is then drawn donwardly by the fan 34 and circulated through the interior of drying chamber 24.

To accommodate exhaust air, the embodiment illustrated in FIG. 4 includes an exhaust duct 86 disposed just below a rear portion of the structure's top 20 and open about the front side in order that air can be directed therethrough into the exhaust inlet end 44 of exchanger 38 and downwardly therethrough where the exhaust air is exhausted out the exhaust outlet section 46 of the exchanger by the positive exhaust fan 56.

In certain selected situations, such as in yellowing tobacco, it may be desirable to operate the structure 10 without air being exhausted. In this event, formed about the top 20 of structure 10 is an opening 82 that allows the drying chamber 24 to be communicatively open to solar collector panel assembly 60.

Provided about openings 82 and 84 is an air flow control means in the form of a damper 80 that is movable between two positions. In one position, damper 80 overlies opening 82 and closes the same, while leaving inlet openings 84 to the solar collector panel assembly open. In a second position, the damper 80 can be moved to an upstanding position where the same closes opening 84 to the solar panel collector assembly, while leaving opening 82 open to the solar collector panel assembly.

Therefore, it is appreciated that, for example, during a yellowing period, damper 80 can be positioned in an upright position so as to close opening 84 such that portions of the internal air being circulated through the drying chamber 24 can be directed up through opening 82 and through the solar collector panel assembly 60 where the air is heated and then returned through the heat exchanger 38 to the drying chamber 24. In certain cases where there is substantial solar energy available, it is believed that the solar energy collected by the solar collector panel assembly 60 would be sufficient to provide all or substantially all of the energy required in say for example, a yellowing phase of curing tobacco.

Then, once it is desired to exhaust air, the damper 80 can be moved to its horizontal position where it blocks opening 82 and the positive exhaust fan 56 can be actuated. In this mode of operation, it is seen that air is directed through exhaust duct 86, through heat exchanger 38 and out the opening occupied by exhaust fan 56. During this period also, inlet fresh air is being directed through opening 84, through the solar collector panel assembly, through heat exchanger 38 and into the drying chamber 24. It is appreciated that during this phase of operation the inlet fresh air is being heated by both the solar collector panel assembly 60 and the heat exchanger 38.

Finally, because the heat exchanger 38 will be condensing water from the exhaust air, the structure shown in FIG. 4 is provided with a water collector 88 that is disposed below the heat exchanger 38. During the drying process, condensed water is collected in collector 88 and this water can be used to wet the wick of a wet bulb thermostat as well as used to order the tobacco after drying.

It should be noted that, for example, with respect to the design shown in FIG. 1, that damper 80 could be operatively associated with a wet bulb thermostat and associated motorized controller for controlling the same. In such event, the web bulb thermostat and controller would actuate and control the damper 80 between the two extreme positions of movement discussed hereinabove.

From the foregoing specification, it is appreciated that the present invention entails and presents a very energy efficient bulk tobacco curing and drying structure as the same effectively preheats incoming fresh air by reclaiming and utilizing heat utilizing a solar panel assembly to further preheat the incoming fresh air. All this is accomplished through a relatively simple and inexpensive design that is very practical and functional, and which can easily be retrofitted to existing barns. It is, therefore, believed that the present bulk tobacco curing and drying structure should save substantial energy over conventional bulk tobacco curing and drying systems.

The terms "upper", "lower", "forward", "rearward", etc., have been used herein merely for the convenience of the foregoing specification and in the appended Claims to describe the bulk tobacco curing and drying structure and its parts as oriented in the drawings. It is to be understood, however, that these terms are in no way limiting to the invention since the bulk tobacco curing and drying structure may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A drying structure for bulk tobacco and other agricultural products comprising: a drying chamber with means therein for supporting material to be dried, a forced air furnace system having fan means for circulating a system of air vertically through the material supported within said drying chamber and including means for adding heat as necessary to maintain the circulating air at a desired temperature level above ambient temperature, exhaust passage means for exhausting portions of the circulating system of air from said drying structure, fresh air inlet passage means for allowing outside fresh air from ambient to join the system of circulating air within the drying structure, an energy efficient heat exchanger system operatively associated with said drying structure for reclaiming heat associated with exhaust air being exhausted from said drying structure, said heat exchanger system comprising a multi-inlet and exhaust stream counter flow heat exchanger disposed in the path of said exhaust and fresh inlet air and including a plurality of exhaust passageways for receiving and channeling exhaust air therethrough and a plurality of inlet air passageways for receiving and channeling the inlet fresh air therethrough with said passageways having inlet and outlet ends, and wherein said plurality of passageways are alternately spaced such that generally every other passageway is an exhaust passageway while the passageway between respective exhaust passageways are fresh air inlet passageways, and wherein said passageways are formed by a plurality of plates disposed in side-by-side relationship such that a relatively narrow and elongated passageway is formed between adjacent plates and wherein each plate extends uninterrupted and continuous through a substantial length of the heat exchanger such that heat can be continuously transferred across the respective plates over the full length of the passageways so as to give rise to an efficient heat transfer between the counter flowing inlet and fresh air passing through the multi-passageways of said heat exchanger.

2. The drying structure of claim 1 further including positive exhaust fan means, separate and independent from the fan means of said furnace system, disposed in the path of said exhaust air for positively inducing exhaust air from said drying structure and through said counter flow heat exchanger.

3. The drying structure of claim 2 wherein said positive exhaust fan means includes a variable speed control means.

4. The drying structure of claim 2 wherein said positive heat exhaust fan means includes a multi-speed control means.

5. The drying structure of claim 1 further including a solar collector panel assembly associated with said drying structure for heating air to be used within the drying structure.

6. The drying structure of claim 5 wherein said solar collector panel assembly is disposed about the top portion of said drying structure and defines a generally horizontal air conduit atop the structure, and wherein said solar collector panel assembly includes a generally thermally dark collector surface and a transparent upper surface spaced thereabove wherein the area between the transparent upper surface and said generally thermally dark collector surface defines said air conduit, whereby as air moves therethrough the solar energy collected by the generally thermally dark surface is transferred to the passing air in the form of heat.

7. The drying structure of claim 5 wherein said solar collector panel assembly is provided with air flow control means for enabling the same to selectively heat outside air being induced into said drying structure during one mode of operation or to heat portion of the system of air circulating within said drying structure during a second mode of operation.

8. The drying structure of claim 7 wherein during one selected mode of operation said air flow control means provided in association with said solar collector panel assembly is set to allow outside air to enter said solar collector panel assembly and to move therethrough where the outside air is heated by said solar collector panel assembly and then directed through said counter flow heat exchanger and into the drying chamber of said drying structure; and during this same selected mode of operation said positive exhaust fan means is actuated to induce a selected portion of air from said drying chamber, through said counter flow heat exchanger and out said drying structure, thereby providing for the simultaneous heating of outside air by said solar collector and the exhaust of air from said drying structure by said positive exhaust fan means.

9. The drying structure of claim 7 wherein during a second selected mode of operation said air flow control means is set to block incoming outside air and to direct a selected portion of circulating air within said drying chamber into said solar collector panel assembly and therethrough where the air is heated in the process, after which the same air is directed through said heat exchanger back into said drying chamber, and during this same mode of operation said positive exhaust fan is maintained inactive and consequently no air is being exhausted from said drying structure.

10. The drying structure of claim 2 wherein said exhaust fan means is disposed on the exhaust side of said heat exchanger.

11. The improved bulk tobacco curing and drying structure of claim 1 wherein said heat exchanger includes a fresh air inlet section and a fresh air outlet section, and an exhaust air inlet section and an exhaust air outlet section.

12. A method of curing and drying bulk tobacco within a curing and drying structure, comprising the steps of: continuously circulating a system of air through tobacco contained in bulk form within said structure and adding heat as necessary to maintain a desired temperature level above ambient temperature within said structure, said system of air being circulated by a forced air furnace system having fan means associated therewith; exhausting selected portions of circulating air from said structure during selected periods of the drying process; selectively directing fresh inlet air from ambient into said structure to join said system of air being circulated through said structure; and routing both said exhaust air and said fresh inlet air through a counter flow heat exchanger by splitting both the exhaust and fresh inlet air into a plurality of relatively narrow separate streams and channeling the air through said heat exchanger in parallel and counter directions with the split inlet air streams and split exhaust air streams being alternately spaced and directed adjacent each other such that generally an inlet stream is flanked on each side by counter flowing exhaust streams and vice versa such that the heat associated with the exhaust air is transferred to the fresh inlet air.

13. The method of curing and drying tobacco as recited in claim 12 further including the step of directing the fresh inlet air through a solar collector for preheating the same prior to entry into the curing and drying structure.

14. The method of curing and drying as recited in claim 13 including condensing moisture from said exhaust air as the same passes through the heat exchanger and directing the condensed moisture from said heat exchanger and collecting the same.

15. The method of claim 12 further including the step of positively exhausting air from the structure by a fan separate and independent from said fan means of said furnace system.

16. The improved drying structure of claim 1 provided with means for receiving water condensed by said counter flow heat exchanger, whereby the received water may be used to wet the wick of a wet bulb thermometer, or order tobacco after drying, or in any other manner desired.

17. The improved drying structure of claim 8 wherein said air flow control means associated with said solar collector panel assembly includes damper means operatively associated with both said solar collector panel and said drying chamber, and wherein said damper means is movable from a first position where said damper means assumes a position closing an opening formed between said solar collector and said drying chamber and allows outside air to enter said solar collector panel assembly, said damper means being further movable to a second position where the damper means closes said collector panel assembly to outside air but allows said opening between said solar collector panel assembly and said drying chamber to be open such that air within said drying chamber may be circulated through said solar collector and heated thereby before being returned to said drying chamber.

18. The drying structure of claim 17 wherein said counter flow heat exchanger is communicatively connected between said drying chamber and said solar collector panel assembly such that air directed through said solar collector panel assembly is ultimately directed into the drying chamber.

19. The drying structure of claim 9 wherein said air flow control means includes a damper movably mounted from a fully open position to a fully closed position; and wherein there is provided a wet bulb thermostat and an associated control operatively associated with said damper for automatically operating the same.

* * * * *